(12) United States Patent
Doss, Jr. et al.

(10) Patent No.: US 8,416,945 B2
(45) Date of Patent: Apr. 9, 2013

(54) ADAPTIVE DUPLEXING FOR AMPLIFIED TELEPHONE

(75) Inventors: Robert L. Doss, Jr., Ringgold, GA (US); David Lashley, Catersville, GA (US); Billy J. Worley, Hixson, TN (US)

(73) Assignee: Plantronics, Inc., Santa Cruz, CA (US)

( * ) Notice: Subject to any disclaimer, the term of this patent is extended or adjusted under 35 U.S.C. 154(b) by 2207 days.

(21) Appl. No.: 10/810,082

(22) Filed: Mar. 26, 2004

(65) Prior Publication Data
US 2005/0213746 A1 Sep. 29, 2005

(51) Int. Cl.
  *H04M 1/00* (2006.01)
  *H04M 9/00* (2006.01)
(52) U.S. Cl. .................................. 379/388.05
(58) Field of Classification Search ............... 379/388, 379/390, 388.05
See application file for complete search history.

(56) References Cited

U.S. PATENT DOCUMENTS 5,450,618 A * 9/1995 Naddell et al. ............. 455/553.1
RE36,934 E * 10/2000 Arnaud .......................... 379/390

* cited by examiner

*Primary Examiner* — Alexander Jamal

(57) ABSTRACT

Systems and methods for reducing squealing or feedback on amplified telephones are disclosed. The telephone system generally includes a receiver in communication with a receive signal path, a transmitter in communication with a transmit signal path, a receiver gain detector configured to detect a receiver gain on the receive signal path, and a controller configured to operate the telephone system in full duplex when the receiver gain is approximately less than a receiver stability level and to operate the telephone system in adaptive duplex when the receiver gain is approximately above the receiver stability level. The adaptive duplex mode is such that an adaptive attenuation level alternately applied on the receive and transmit signal paths is dependent upon the level by which the receiver gain exceeds the receiver stability level.

18 Claims, 4 Drawing Sheets

ADAPTIVE DUPLEXING FOR AMPLIFIED TELEPHONE

BACKGROUND OF THE INVENTION

1. Field of the Invention

The present invention relates generally to telephony. More specifically, systems and methods for reducing squealing or feedback on amplified telephones are disclosed.

2. Description of Related Art

An amplified telephone is a high performance telephone that amplifies audio signals to allow hearing impaired users to use the telephone without other hearing aides. When delivering a large amount of gain, the amplified telephone tends to suffer from squealing (i.e., feedback or the Larsen effect) as a result of the amplified telephone also amplifying background noise on the line such that the telephone's microphone (transmitter) picks up the amplified background noise. The signal generated by the microphone is again amplified through the amplified telephone's speaker (receiver) via side tone and the amplified telephone system becomes unstable. Side tone generally refers to the sound coming from the receiver that originated in the microphone. In other words, when a telephone user speaks into the telephone microphone, the user hears his own voice (side tone) through the receiver. Because of side tone, an amplified telephone generally cannot be amplified above a stability level of approximately 30 to 35 dB of gain without some mechanism for alleviating or preventing the resultant squealing. The squealing or Larsen effect is also commonly referred to as howling or acoustic instability similar to what happens when a microphone on a public address system is placed too close to a speaker.

Various methods have been implemented to alleviate or prevent the squealing in order to amplify the telephone above the 30 to 35 dB threshold gain in a stable manner. For example, a digital signal processor (DSP) may be employed to eliminate acoustic and line echoes. However, the cost of a DSP solution prevents its use in lower cost amplified telephones.

Another method to alleviate the squealing is to utilize half duplex, i.e., the telephone is either sending or receiving a signal but not both at the same time. In other words, a user using a half duplex telephone cannot simultaneously speak and hear what the other party is saying. Many speakerphones are half duplex. In half duplex mode, acoustic instability is controlled by muting or severely attenuating the receiver when the user is talking, and by muting or severely attenuating the transmitter when the user is listening. Half duplex produces the undesirable effect of the user having to wait until the person on the other end of the conversation stops speaking before the user can speak. Systems operating in half duplex mode are not as popular as full duplex systems and are much more difficult for hearing impaired persons to use. In addition, even sophisticated half duplex algorithms tend to produce an annoying artifact whereby the user notices that the phone is in half duplex.

Thus it would be desirable to provide an improved system and method for reducing the squealing or feedback on amplified telephones while minimizing or reducing undesirable artifacts.

SUMMARY OF THE INVENTION

Systems and methods for reducing squealing or feedback on amplified telephones are disclosed. It should be appreciated that the present invention can be implemented in numerous ways, including as a process, an apparatus, a system, a device, or a method. Several inventive embodiments of the present invention are described below.

The telephone system generally includes a transmitter in communication with a transmit signal path, a receiver in communication with a receive signal path, a receiver gain detector configured to detect a receiver gain, and a controller configured to operate the telephone system in full duplex when the receiver gain is approximately below a receiver stability level and to operate the telephone system in adaptive duplex when the receiver gain is approximately above the receiver stability level. The adaptive duplex mode is such that an adaptive attenuation level alternately applied on the receive signal and transmit signal paths is dependent upon the level by which the receiver gain exceeds the receiver stability level. As an example, the receiver stability level may be between approximately 30 and 35 dB of gain on the receive signal path.

The telephone may include a volume control by which a user can select a volume setting and a boost function selector by which the user can activate or deactivate a boost function. The receiver gain detector detects the settings on the volume control and the boost function to determine the receiver gain. The receiver gain detector may monitor the receiver gain throughout a telephone call such that the controller adapts the attenuation level in response thereto throughout the telephone call.

In full duplex, the controller does not apply attenuation to signals on the receive signal path or to signals on the transmit signal path. In adaptive duplex, the controller may switch between an active receive mode during which the controller applies the adaptive attenuation level on the signals on the transmit signal path and an active transmit mode during which the controller applies the adaptive attenuation level on the signals on the receive signal path. The attenuation level may be approximately equal to the level by which the receiver gain exceeds the receiver stability level.

A telephone system may further include a transmit signal detector to detect a signal level on the transmit signal path such that when in adaptive duplex, the controller alternates between the active receive mode and the active transmit mode depending upon the transmit path signal level. In adaptive duplex, the controller switches to the active transmit mode when the transmit path signal level is at least equal to a predefined transmit signal threshold and switches to the active receive mode when the transmit path signal level is less than the transmit signal threshold.

According to another embodiment, an amplified telephone generally includes means for detecting a receiver gain level selected by a user on the amplified telephone and means for controlling the telephone to operate in full duplex when the receiver gain level is approximately below a receiver stability level and to operate in adaptive duplex when the receiver gain is at least the receiver stability level, the adaptive duplex being such that an adaptive attenuation level alternately applied on a receive signal path and a transmit signal path is dependent upon a level by which the receiver gain level exceeds the receiver stability level, the controlling means being in communication with the receiver gain detector.

According to yet another embodiment, an adaptive duplexing method generally includes detecting a receiver gain level selected by a user on a telephone and controlling the telephone to operate in full duplex when the receiver gain level is approximately below a receiver stability level and to operate in adaptive duplex when the receiver gain is at least the receiver stability level, the adaptive duplex being such that an adaptive attenuation level alternately applied on a receive signal path and a transmit signal path of the telephone is dependent upon a level by which the receiver gain level exceeds the receiver stability level.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
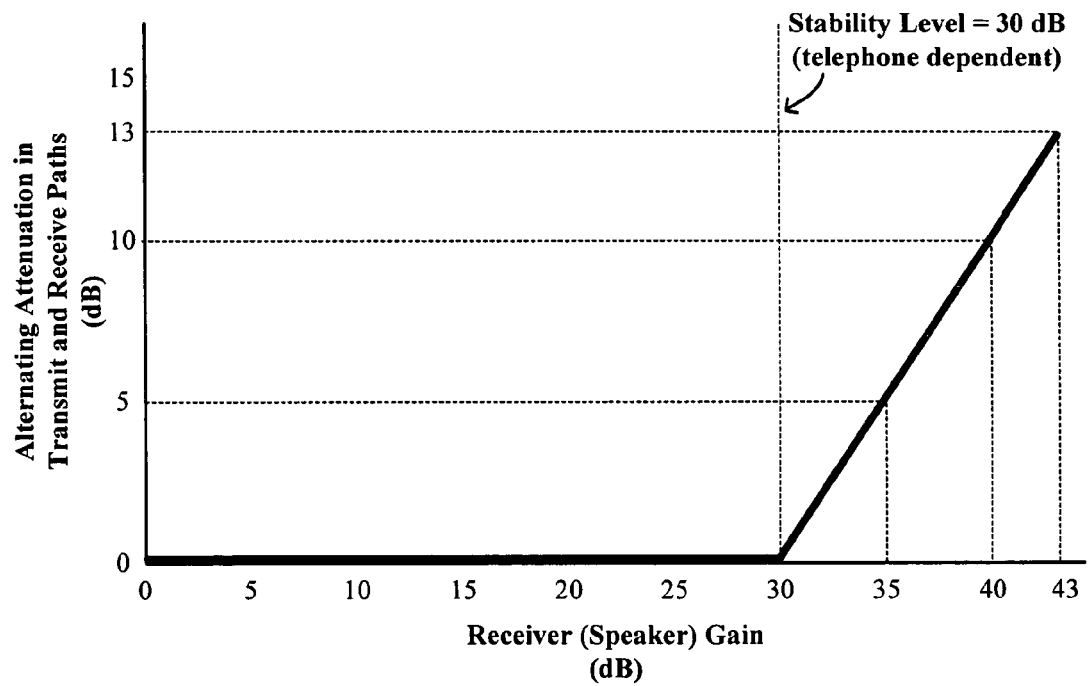
FIG. 1 is a graph illustrating adaptive duplexing in terms of attenuation level switching or alternating between the transmit and receive paths as a function of receiver gain.

Systems and methods for reducing squealing or feedback on amplified telephones are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

An amplified telephone delivers a relatively large level of gain on the receive (speaker) channel or path in order to facilitate a user with hearing loss to utilize the telephone without other hearing aides. In delivering the amplification on the receive channel, the amplified telephone also amplifies background noise on the line which can be picked up by the telephone's microphone (transmitter). As the signal generated by the microphone is fed back to the receiver via side tone, the microphone signal is again amplified through the amplified telephone's receiver (speaker) and the amplified telephone system becomes unstable. The instability causes squealing or howling, i.e., feedback or the Larsen effect. Thus, because of the receiver amplification and the side tone, an amplified telephone cannot be amplified above a stability level of approximately 30 to 35 dB of gain without becoming unstable and without the need for some mechanism to alleviate or prevent the resultant squealing. The stability level generally refers to the maximum receive gain that can be maintained without generating acoustic instability.

In order to prevent or minimize acoustic instability, the telephone may alternately attenuate signals in the transmitting (microphone) path when the user is listening and attenuate signals in the receiving (speaker) path when the user is talking. Conventionally, the level of attenuation is fixed regardless of the volume and, as such, each path is muted or severely attenuated, causing an undesirable artifact whereby the user notices that the telephone is in half duplex mode.

However, because the telephone does not become unstable until the receiver gain is above the stability level of approximately 30 to 35 dB, the amplified telephone may adapt the attenuation to the receiver gain, i.e., the volume level that the user selects. In particular, the amplified telephone would not attenuate the signals when the receiver gain does not cause instability, i.e., when the receiver gain is less than approximately 30 to 35 dB. As such, the amplified telephone would operate in full duplex mode up to the stability level. The amplified telephone would attenuate the signals when the receiver gain would cause instability, i.e., when the receiver gain is greater than or equal to approximately 30 to 35 dB. For receiver gains at or above approximately 30 to 35 dB, the amplified telephone would attenuate the signals but only to the extent to prevent instability. Such an attenuation mechanism thus minimizes the switching to reduce the undesirable artifact effect that often exists in half duplex systems.

In particular, a conventional half duplex system switches muting or severely attenuates with a fixed attenuation of at least 20 dB between the transmitter and the receiver to maintain stability. In a conventional half duplex system, the level of attenuation is fixed regardless of the volume level selected by the user. However, the amplified telephone only needs to switch-in attenuation to the receive and transmit paths if the phone is operating above the stability level. Operating points below the stability level do not require switching in of attenuation while operating points above the stability level require some level of attenuation to prevent instability.

FIG. 1 is a graph illustrating adaptive attenuation or duplexing as represented in terms of the attenuation level as a function of receiver gain. The attenuation alternates between the transmit and receive paths depending on whether the telephone is in active receive or transmit mode, respectively. In the example shown, the receiver gain stability level or point is 30 dB, above which the telephone would be unstable. The stability level depends on the particular amplified telephone. The stability level generally refers to the maximum amount of receive gain that is sustainable without acoustic feedback when the transmitter (microphone) is set to nominal levels (not attenuated). The stability level may be determined by, for example, operating the telephone at the highest repeatable gain level that does not generate open air instability or does not generate instability as the handset is brought near the user's face.

The receiver gain ranges from nominal (0 dB) to, for example, 43 dB. The amplified telephone may provide a volume control that allows the user to adjust the volume level, and thus the control potentiometer position, so that the gain on the receive path is between, for example, 0 and 15 dB. The amplified telephone may also provide a boost function to assist those with moderate hearing loss. The user may activate the boost function by, for example, depressing a boost button. When activated, the boost function may provide between, for example, 12 and 43 dB of gain on the receive path, depending on the volume control level set by the user. For example, if the user sets the volume control level to the minimum and activates the boost function, the gain on the receive path would be 12 dB. If the user sets the volume control level to the maximum and activates the boost function, the gain on the receive path would be 43 dB.

As shown, no attenuation is applied by the amplified telephone when the receiver gain is less than the stability level of 30 dB. Thus, at receiver gains less than the stability level, the amplified telephone operates in a full duplex mode. At receiver gains at or above 30 dB, attenuation is applied so that the level of the attenuation is equal to the amount of receiver gain that is above the stability level. For example, at a receiver gain of 35 dB, the attenuation is 5 dB or 35 dB less the stability level of 30 dB. Similarly, at a receiver gain of 43 dB, the attenuation is 13 dB or 43 dB less the stability level of 30 dB. As is evident, the attenuation applied is only the extent necessary to prevent instability, although various other suitable attenuation to receiver gain ratios may be employed. In addition, the relationship between the attenuation level and the receiver gain above the stability level as shown in FIG. 1 is linear although various other transfer functions between the attenuation level and the receiver gain above the stability level may be implemented.

Figure 2:
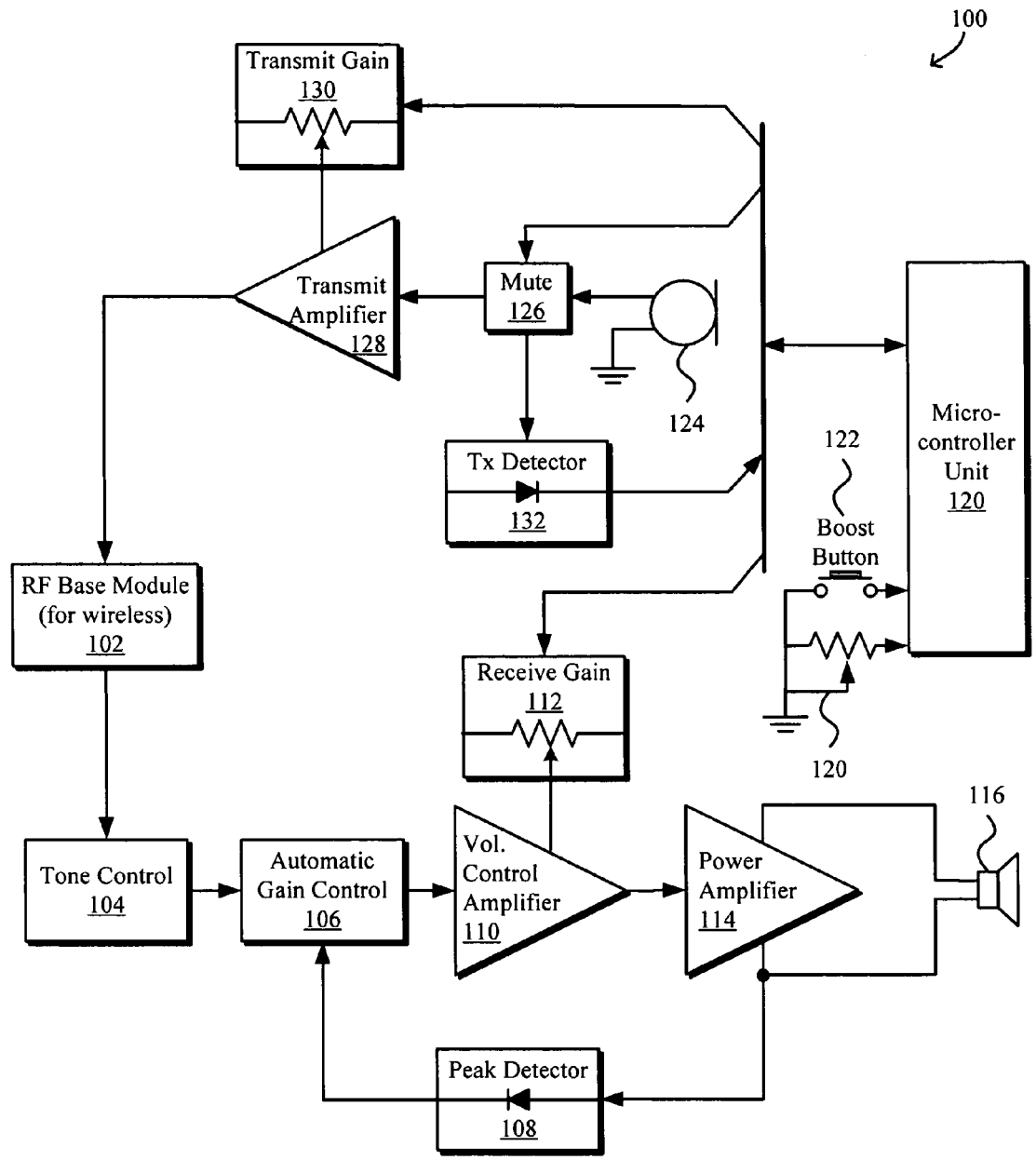
FIG. 2 is an illustrative hardware diagram implementing adaptive duplexing.

FIG. 2 is a hardware diagram of an illustrative wireless amplified telephone system 100 implementing adaptive duplexing or attenuation. Although an illustrative hardware embodiment is shown, any combination of software and/or hardware implementation of the processes described herein may be employed. As shown, telephone system 100 includes a radio frequency (RF) module for wirelessly transmitting and receiving signals to and from, respectively, the headset or handset receiver, for example. Although a cordless amplified telephone system 100 is shown and described herein, various other types of telephone systems may be employed. For example, the adaptive duplexing may be employed with amplified telephones with corded or cordless handset or headset receiver or a neckloop device.

On the receive side, the base module 102 transmits receive signals to a tone control module 104 that may apply certain tone controls to the received signals and to an automatic gain or soft limiting control module 106. The automatic gain or soft limiting module 106 may facilitate in maintaining the receive level to below the Underwriters Laboratories (UL) safety limit. In one example, up to 43 dB of gain on the receive channel may be selected by the user such that the resultant audio would exceed the UL safety limit of 124 dBSPL. Because back to back diode stacks would introduce severe harmonic distortion as they act on the audio, a soft compression limiter module 106 may be employed to back the receiver gain of the system down as audio level approaches 120 dBSPL, for example. As the soft compression limiter module 106 is generally not fast enough to limit instantaneous sounds, a peak detector 108 may be used for failsafe operation, e.g., diodes in corded telephones and battery limiting in cordless designs. A volume control amplifier 110 amplifies the volume on the receive signals in accordance with the level set by the receive gain module 112. The receive gain module 112 is in turn set by a microcontroller or microprocessor unit 120 as will be described in more detail below. A power amplifier 114 then drives a speaker 116.

On the transmit side, signals from a microphone 124 may be muted by the mute module 126 if the user has activated the mute function. The mute module 126 may be controlled by an input from the microcontroller unit 120. The level of the transmit signal is amplified (or attenuated) by the transmit amplifier 128 in accordance with the level set by the transmit gain module 130 which in turn receives as input the transmit attenuation level as determined by the microcontroller unit 120 as will be described in more detail below.

A transmit detector 132 detects the level of the transmit signal, i.e., senses activity on the transmitter (microphone), and outputs the transmit signal level to the microcontroller unit 120. The microcontroller unit 120 determines whether the user is talking, i.e., whether the system should be in an active transmit mode, based on the transmit level. For example, a predefined transmit switch point or activation threshold may be programmed in software in the microcontroller unit 120 such that the microcontroller determines that the user is speaking when the transmit level is at or above the transmit switch point and that the user is listening when the transmit level below the transmit switch point. In one example, the transmit activation threshold may be set to approximately 84 dBSPL.

The transmit detector 132 may integrate the transmit signal using, for example, a charge capacitor. The transmit detector 132 may also be employed to monitor the background noise level on the transmit path. In particular, when the telephone system 100 is in the active receive mode, the microcontroller unit 120 may monitor, via the transmit detector 132, the signal level on the transmit channel to determine the level of background noise. If the microcontroller unit 120 determines that there is an excessive amount of background noise, e.g., if the signal level is greater than a predefined noise threshold, the microcontroller unit 120 may increase the transmit activation threshold slightly so as to reduce the incidence of false triggering into the active transmit mode from the active receive mode.

The microcontroller unit 120 determines the receive amplification (speaker volume) level by detecting the level at which the user sets the volume and whether the user has activated the boost function, e.g., by depressing the boost button. The stability level for the telephone system 100 may be programmed in software in the microcontroller unit 120. As discussed above, if the receive amplification level (volume level on the speaker 116) taking into account the settings of the volume control 118 and the boost function 122 is below the stability level, the microcontroller unit 120 operates the telephone system 100 in full duplex mode, i.e., no switching. On the other hand, if the receive amplification level is at or above the stability level, then the microcontroller unit 120 switches attenuation between the receive and the transmit channels and adapts the attenuation level depending upon the receive amplification level to prevent system instability. Note that the speaker volume level is continuously or continually monitored by the microcontroller unit 120 during a given telephone call such that the attenuation is adaptive in response thereto.

As noted above, both the receive gain module 112 and the transmit gain module 130 receive as input the attenuation level as determined by the microcontroller unit 120. If the microcontroller unit 120 determines that the system is in an active transmit mode, then the microcontroller unit 120 switches on the attenuation in the receive path and switches off attenuation in the transmit path. Conversely, if the microcontroller unit 120 determines that the system is in an active receive mode, then the microcontroller unit 120 switches on the attenuation in the transmit path and switches off attenuation in the receive path.

The microcontroller unit 120 may also determine if the user has selected high or certain other frequencies for special amplification and emphasis. If high frequencies are selected for special amplification and emphasis, the microcontroller unit 120 may automatically lower the system stability level as high frequencies more readily produce feedback in amplified handset applications. In addition, microcontroller unit 120 may either be preprogrammed or may automatically adjust the stability level in accordance with the particular transmit device the user is currently using, e.g., headset versus handset, as the stability level should be lower for headsets because the microphone is typically closer to the receiver (speaker) in a headset than in a handset. The stability levels for the various component transmit devices may be preprogrammed in software in the microcontroller unit 120.

In operation, the microprocessor unit 120 determines whether the receiver gain is at or above the stability level. If the receiver gain is below the stability level, the microprocessor unit 120 does not apply attenuation to either the receive or the transmit path. However, if the receiver gain is at or above the stability level, the microprocessor unit 120 determines whether the system is in an active transmit or an active receive mode based on whether the user is talking or listening, i.e., the detected transmit level. The microprocessor unit 120 then alternately applies attenuation on the receive and transmit paths when the system in the active transmit mode or the active receive mode, respectively. In particular, the microprocessor unit 120 alternates between attenuating the transmit path and the receive path depending on whether the user is listening or talking, i.e., alternately setting the transmit gain module 130 and the receive gain module 112 with the adaptive attenuation. Thus, if the microprocessor unit 120 determines that the user is talking, the system 100 is in an active transmit mode and the microprocessor unit 120 applies an appropriate attenuation on the receive path so as to prevent the system instability. Alternatively, if the microprocessor unit 120 determines that the user is listening, then the system 100 is in an active receive mode and the microprocessor unit 120 applies an appropriate attenuation on the transmit path so as to prevent the system instability.

Figure 3:
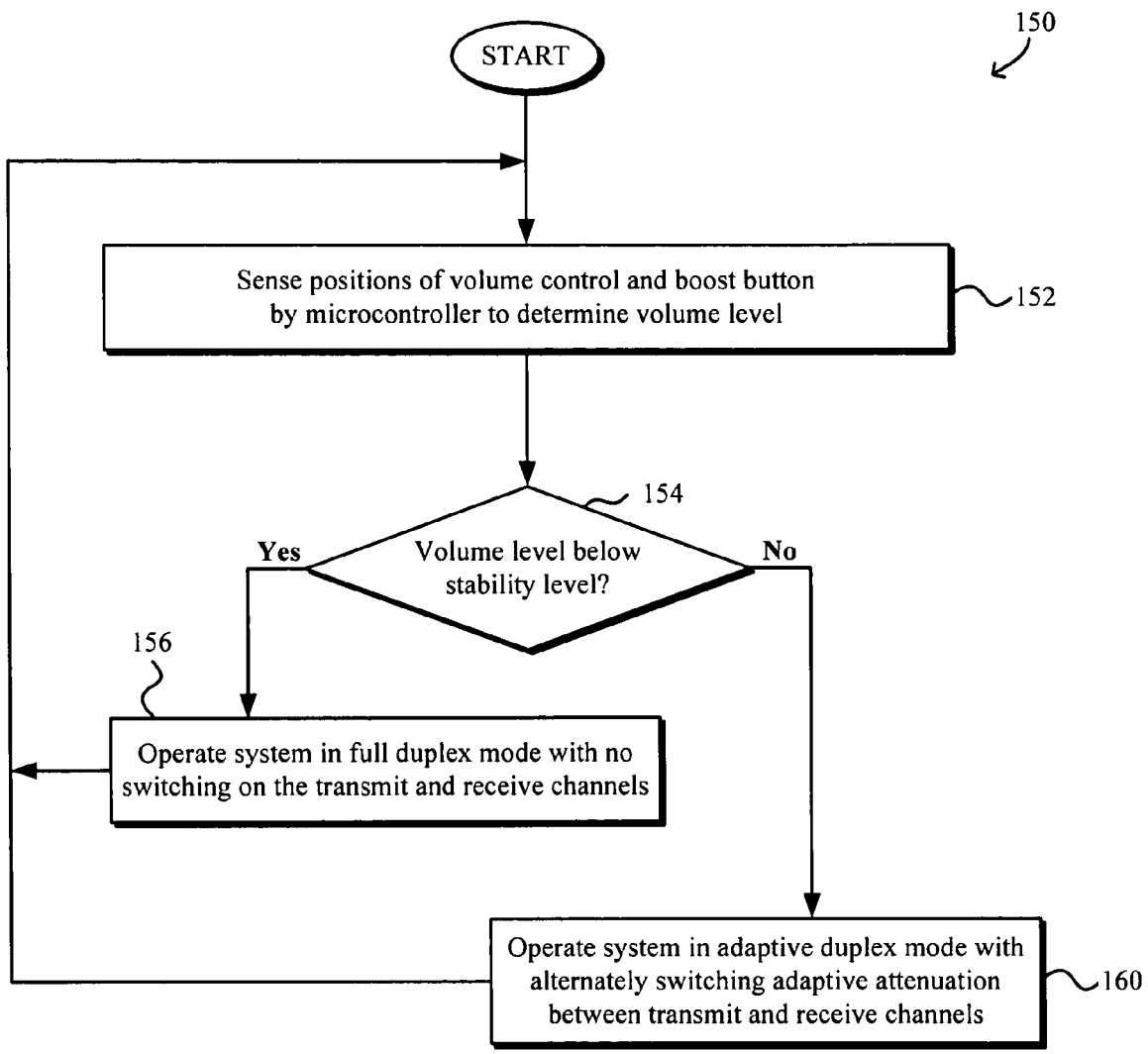
FIG. 3 is a flowchart of an illustrative process for adaptive duplexing in which the attenuation level alternating between the transmit and receive channels depends on the receiver gain.

FIG. 3 is a flowchart of an illustrative process 150 for adaptive duplexing in which the system adapts the attenuation level alternating between the transmit and receive channels depending on the receiver gain. In particular, at block 152, the microcontroller unit senses the positions of the volume control 118 as selected or set by a user and the boost button 122 to determine the volume level, e.g., between 0 and 43 dB gain. At decision block 154, the microcontroller unit determines whether the volume level is below the stability point, e.g., 30 dB. If so, the microcontroller unit does not perform switching on the transmit and receive channels and the system operates in full duplex mode at block 156. Alternatively, if the microcontroller unit determines that the volume level is at or above the stability point, the microcontroller unit alternately switches adaptive attenuation between the transmit and the receive channels and the system operates in adaptive duplex mode at block 160. The process 150 continues by returning to block 152 to monitor the volume level and to selectively switch adaptive attenuation between the transmit and receive channels throughout the telephone call. Thus, during a given telephone call, the user may adjust the volume control 118 and/or activate/deactivate the boost button 122 repeatedly and the system adapts the duplexing mode of the system in response thereto.

Figure 4:
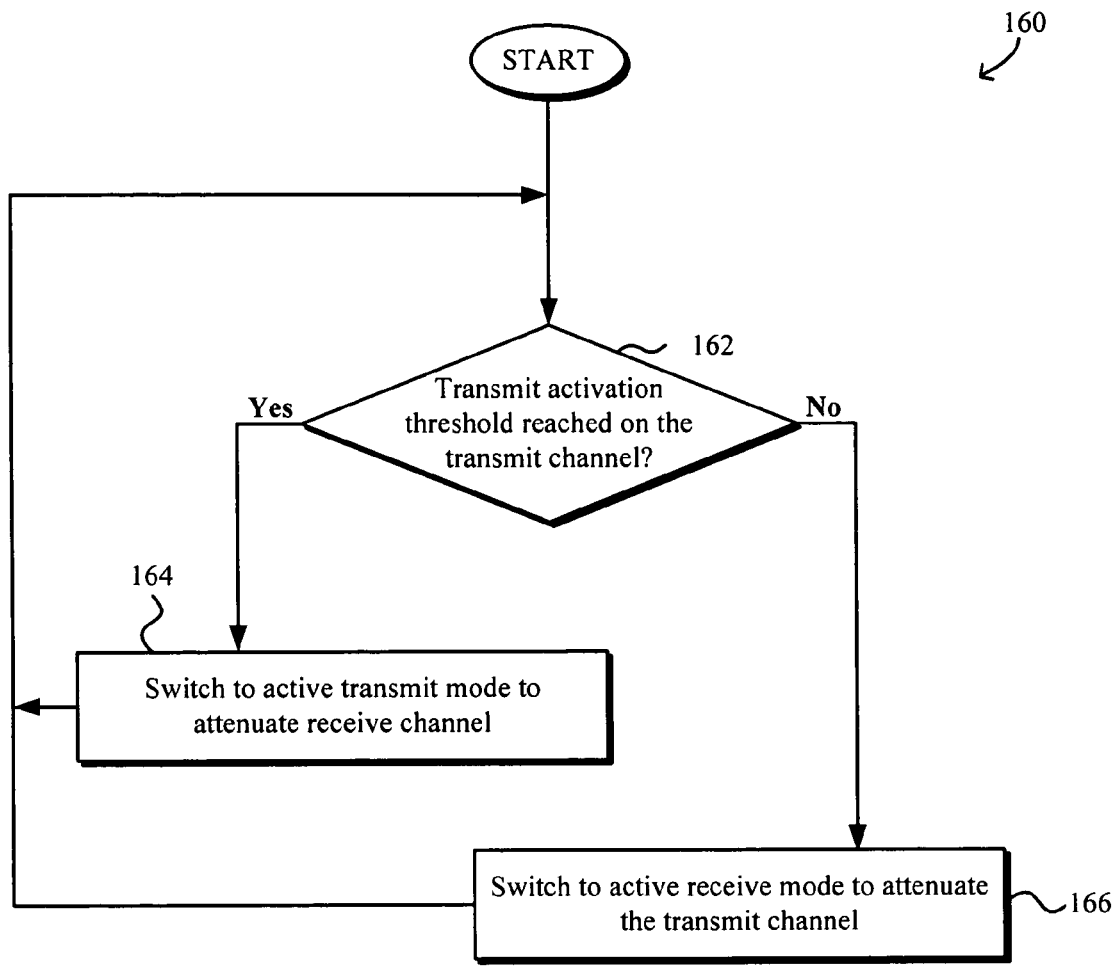
FIG. 4 is a flowchart of illustrating the process of alternatively switching adaptive attenuation between the transmit and receive channels in more detail.

FIG. 4 is a flowchart of illustrating the process 160 of alternatively switching adaptive attenuation between the transmit and receive channels of process 150 as shown in FIG. 3 in more detail. Specifically, at decision block 162, the microcontroller unit determines if the signal level on the transmit channel has reached the transmit activation threshold. If so, the microcontroller unit switches to (or remains at) the active transmit mode at block 164. If not, then the microcontroller unit switches to (or remains at) the active receive mode at block 166. The process 160 returns to decision block 162 to continue monitoring the signal level on the transmit channel throughout the duration of the telephone call.

The systems and methods described herein facilitate in preventing the instability (howling or squealing) by alternately reducing the gain of the receiver and the gain of the transmitter by the minimum amount required to prevent the instability. Because only the minimum amount of attenuation is applied with adaptive duplexing, the telephone system can be amplified higher without the undesired artifact effect that is noticeable to the user. In particular, the system operates in a full-duplex manner, i.e., without any switching if the volume settings are such that the volume level is below the stability level. Once the microcontroller unit detects that the user has increased the volume control 118 and/or boost control 122 such that the volume level is at or above the stability level, the microcontroller unit automatically inserts just enough attenuation alternately on the transmit or receive path to maintain stability. One benefit of such an approach is that the less the attenuation applied, the more difficult it is for the user to discern the switching. The above-described approach thus minimizes the ability of the user to discern the switching. In contrast, the user can generally easily discern a 20 dB switching that is typically applied with half-duplex telephone systems. The user also advantageously maintains full duplex operation at lower volumes up to the system stability level.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A telephone system, comprising:
a transmitter in communication with a transmit signal path;
a receiver in communication with a receive signal path, the receiver having associated therewith a receiver gain;
a receiver gain detector configured to detect the receiver gain, the telephone system having a receiver stability level associated therewith; and
a controller in communication with the receiver gain detector, the controller being configured to selectively operate the telephone system in a full duplex mode in response to the receiver gain being approximately less than the receiver stability level and to selectively operate the telephone system in an adaptive duplex mode in response to the receiver gain being approximately above the receiver stability level, the adaptive duplex mode being such that an adaptive attenuation level alternately applied on the receive signal and transmit signal paths is dependent upon the level by which the receiver gain exceeds the receiver stability level.

2. The telephone system of claim 1, wherein the attenuation level alternately applied on the receive signal and transmit signal paths is approximately equal to the level by which the receiver gain exceeds the receiver stability level.

3. The telephone system of claim. 1, wherein the receiver gain detector is configured to monitor the receiver gain throughout a telephone call and the controller adapts the attenuation level in accordance with the monitored receiver gain.

4. The telephone system of claim 1, further comprising a volume control by which a user may select a volume setting and a boost function selector by which the user may activate and deactivate a boost function, wherein the receiver gain detector is in communication with the volume control and the boost function selector and wherein the receiver gain is a function of the volume setting and the status of the boost function.

5. The telephone system of claim 1, wherein when the controller is operating in the adaptive duplex mode, the controller is further configured to switch between an active receive mode during which the controller applies the adaptive attenuation level on the transmit signal path and an active transmit mode during which the controller applies the adaptive attenuation level on the receive signal path.

6. The telephone system of claim 5, further comprising a transmit signal detector configured to detect a transmit path signal level on the transmit signal path, the transmit signal detector being in communication with the controller, wherein when in the adaptive duplex mode, the controller is alternately in the active receive mode and the active transmit mode depending upon the transmit path signal level.

7. The telephone system of claim 6, wherein when in the adaptive duplex mode, the controller is configured to switch to the active transmit mode when the transmit path signal level is at least equal to a predefined transmit signal threshold and to switch to the active receive mode when the transmit path signal level is less than the transmit signal threshold.

8. The telephone system of claim 1, wherein the full duplex mode is such that the controller applies zero attenuation to signals on the receive signal path and to signals on the transmit signal path.

9. The telephone system of claim 1, wherein the receiver stability level is between approximately 30 and 35 dB of gain.

10. An amplified telephone, comprising:
  means for detecting a receiver gain level selected by a user on the amplified telephone, the telephone having a receiver stability level associated therewith; and
  means for controlling the telephone to selectively operate in full duplex in response to the receiver gain level being approximately less than the receiver stability level and to selectively operate in adaptive duplex in response to the receiver gain being at least the receiver stability level, the adaptive duplex being such that an adaptive attenuation level alternately applied on a receive signal path and a transmit signal path is dependent upon a level by which the receiver gain level exceeds the receiver stability level, the controlling means being in communication with the receiver gain detector.

11. The amplified telephone of claim 10, wherein the attenuation level alternately applied on the receive and transmit signal paths is approximately equal to the level by which the receiver gain exceeds the receiver stability level.

12. The amplified telephone of claim 10, wherein the means for detecting monitors the receiver gain throughout a call on the amplified telephone and the means for controlling adapts the attenuation level, in accordance with the monitored receiver gain level.

13. The amplified telephone of claim 10, wherein the means for detecting detects the receiver gain level as a function of a user-selected volume setting and a user-selected boost function status.

14. The amplified telephone of claim 10, wherein the controlling means switches between an active receive mode and an active transmit mode when operating the telephone in adaptive duplex, the active receive mode being that the controlling means applies the adaptive attenuation level on transmit signals on the transmit signal path and the active transmit mode being that the controlling means applies the adaptive attenuation level on receive signals on the receive signal path.

15. The amplified telephone of claim 14, further comprising a transmit signal detecting means for detecting a transmit path signal level on the transmit signal path, the transmit signal detecting means being in communication with the controlling means, wherein when operating in adaptive duplex, the controlling means is alternately in the active receive mode and the active transmit mode depending upon the transmit path signal level.

16. The amplified telephone of claim 15, wherein when in adaptive duplex, the controlling means is configured to switch to the active transmit mode when the transmit path signal level is at least equal to a predefined transmit signal threshold and to switch to the active receive mode when the transmit path signal level is less than the transmit signal threshold.

17. The amplified telephone of claim 10, wherein operating in full duplex is such that the controlling means applies zero attenuation to signals on the receive signal path and to signals on the transmit signal path.

18. The amplified telephone of claim 10, wherein the receiver stability level is between approximately 30 and 35 dB of gain.

* * * * *